United States Patent [19]

Pury et al.

[11] 4,105,920
[45] Aug. 8, 1978

[54] X-RAY SPOT FILM DEVICE

[75] Inventors: Thomas Pury, Brookfield; Floyd L. Gray, Hales Corners; Marvin L. Sivertsen, Milwaukee; Robert L. Konle, New Berlin; Richard E. Stehr, Hartland, all of Wis.

[73] Assignee: General Electric Company, Schenectady, N.Y.

[21] Appl. No.: 740,574

[22] Filed: Nov. 10, 1976

[51] Int. Cl.² .................................... G03B 41/16
[52] U.S. Cl. ............................ 250/402; 250/468; 250/471
[58] Field of Search .............. 250/468, 470, 471, 401, 250/402

[56] References Cited

U.S. PATENT DOCUMENTS

| 3,514,596 | 5/1970 | Naylor | 250/471 |
|---|---|---|---|
| 3,521,061 | 7/1970 | Slagle | 250/471 |
| 3,848,134 | 11/1974 | Gieschen | 250/471 |
| 3,862,426 | 1/1975 | Thomas | 250/471 |
| 3,989,950 | 11/1976 | Hunt | 250/471 |

Primary Examiner—Craig E. Church
Attorney, Agent, or Firm—Ralph G. Hohenfeldt

[57] ABSTRACT

In a spot film device, the inner and main carriages for a film cassette are positioned with reversible servo motors. An x-ray grid is mounted on the bottom of the main carriage and a cross grid is mounted on tracks beneath the carriage such that the cross grid may be used or not used for fluoroscopy and both grids may be used for radiography. Field defining masks are also mounted for translating selectively with the carriage. Individual reversible servo motor drives are used to advance and retract the masks and cross grid. Means are provided for absorbing shock or negating drive system momentum when the masks or grid are stopped abruptly. Reduced power is applied to the mask and grid drive motors when the masks and grid reach their stops for holding them against their stops. A motor driven palpator cone, having unique driving and locking means is provided. Means are provided for loading and unloading cassettes from either the front or rear of the spot film device.

10 Claims, 23 Drawing Figures

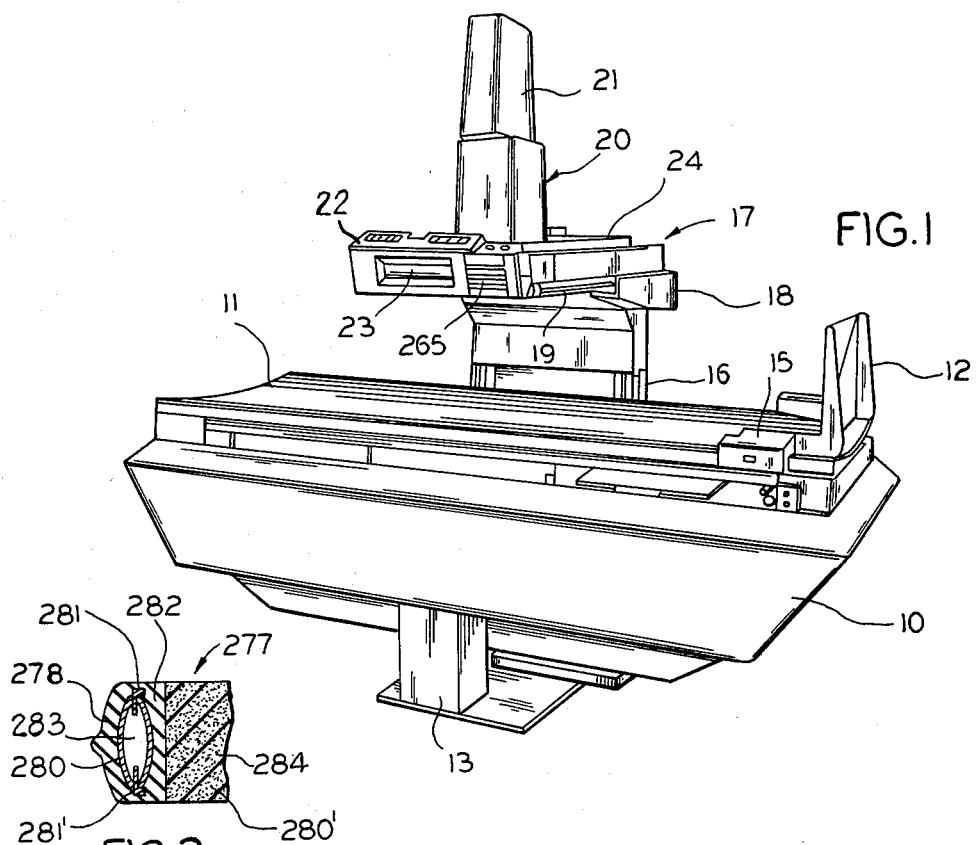
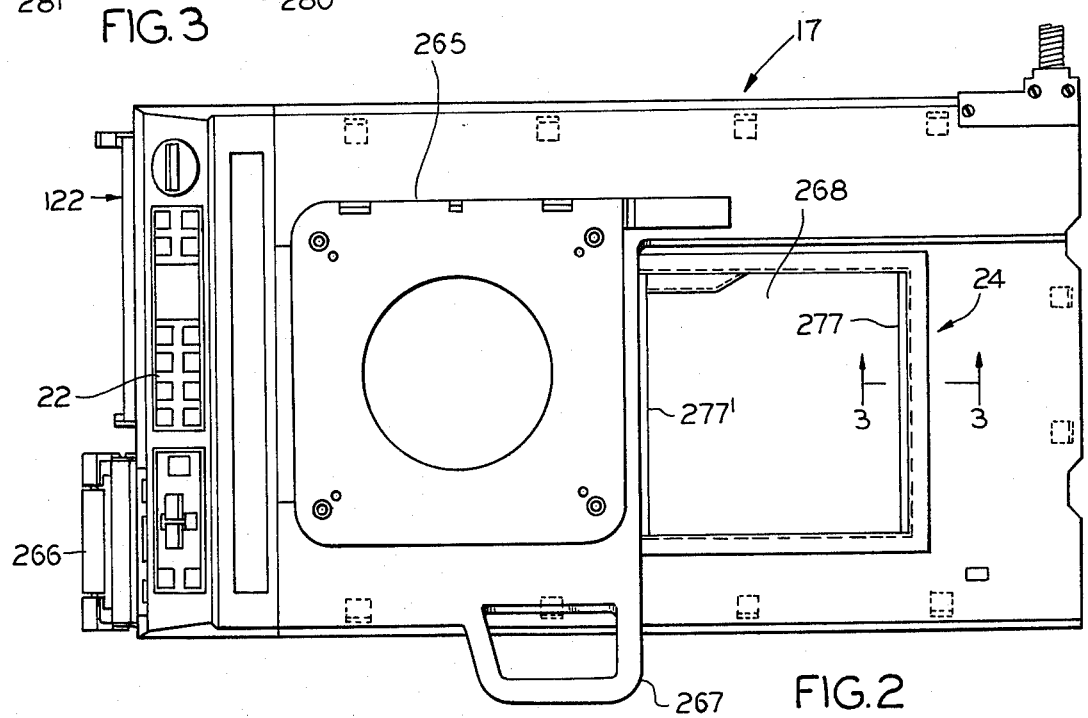

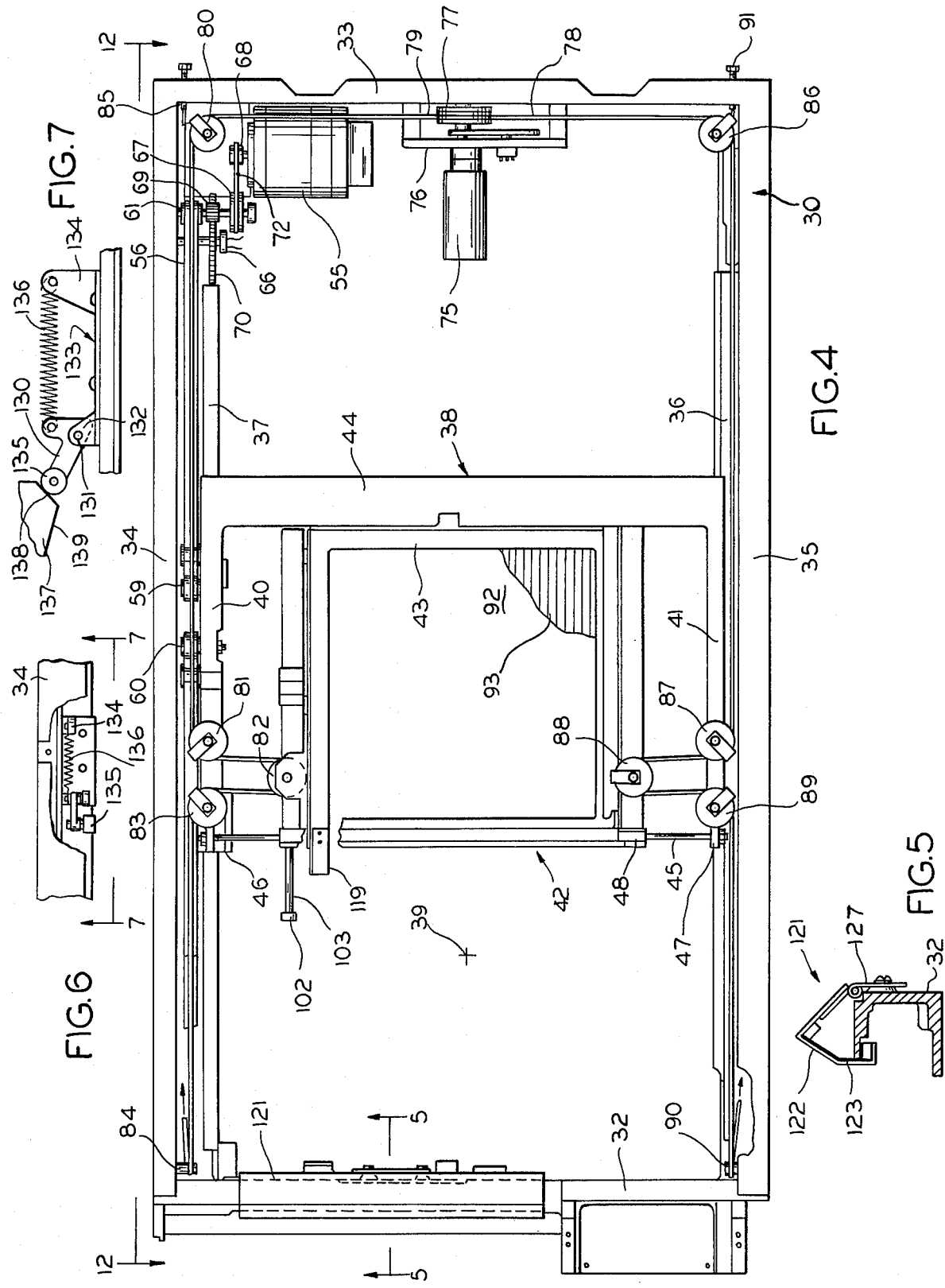

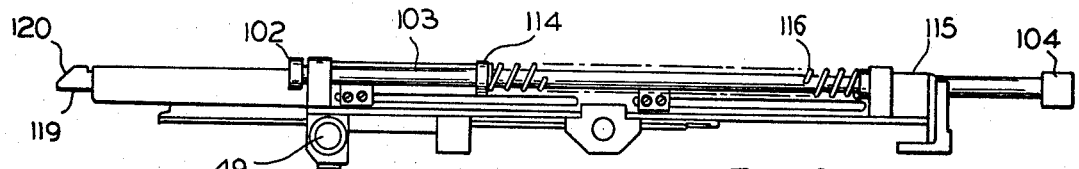
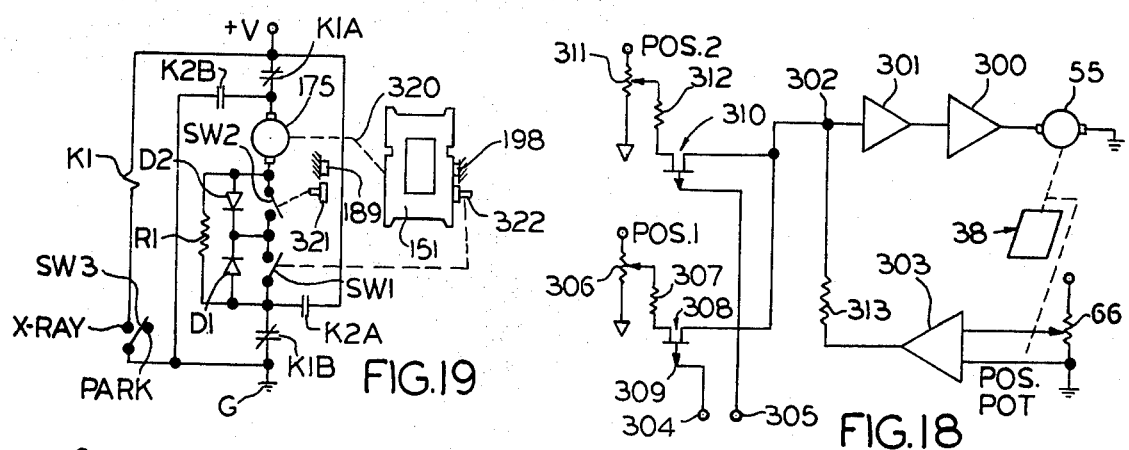
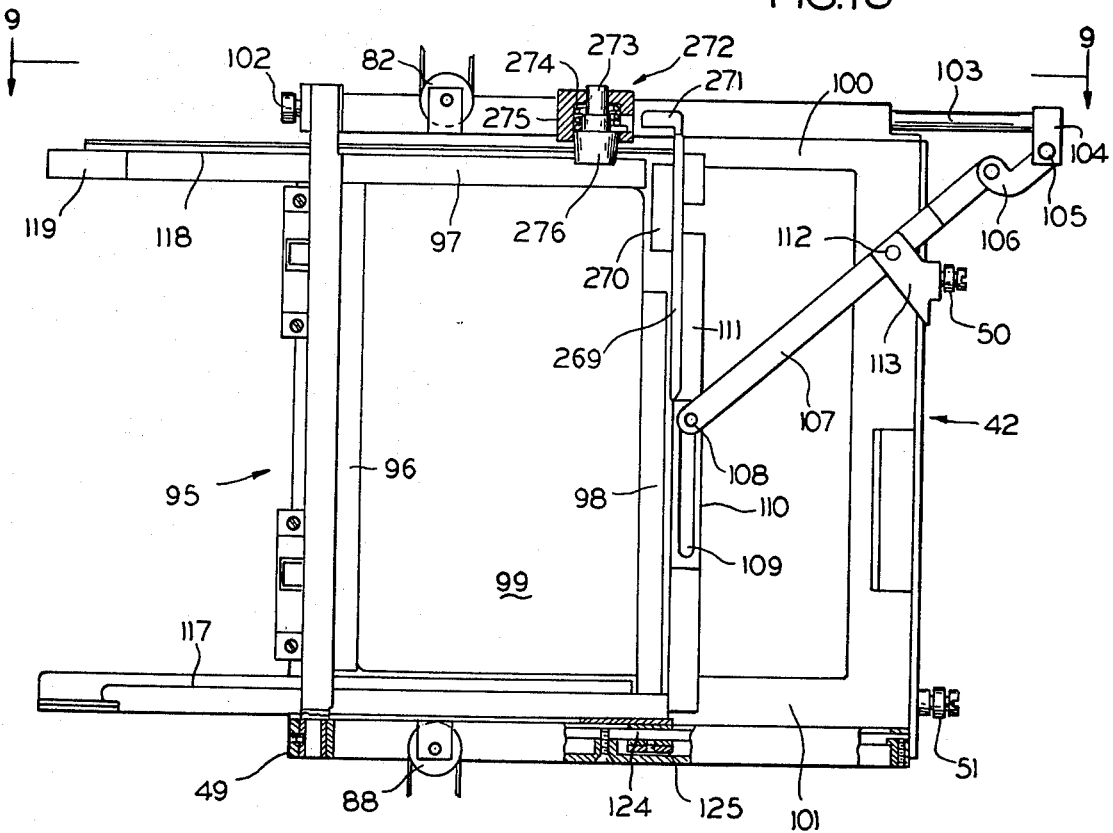

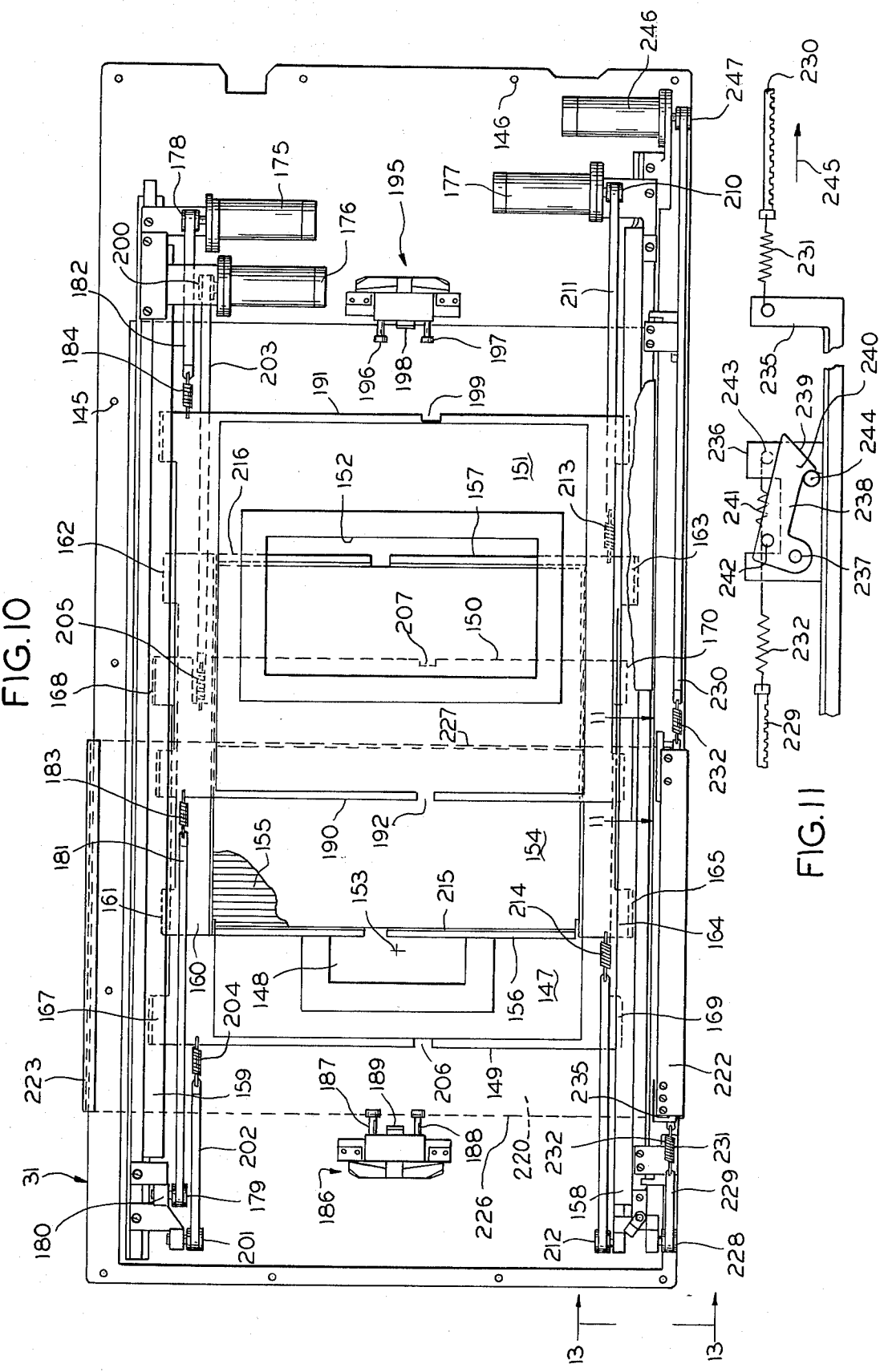

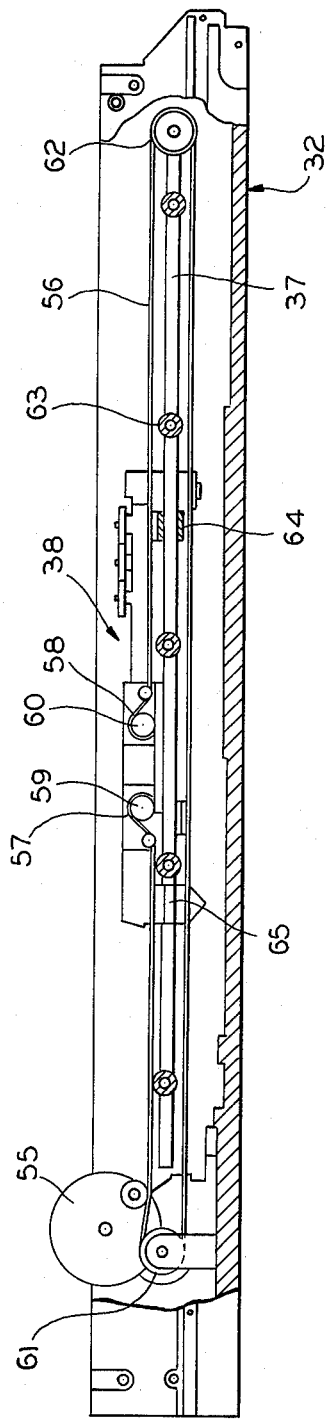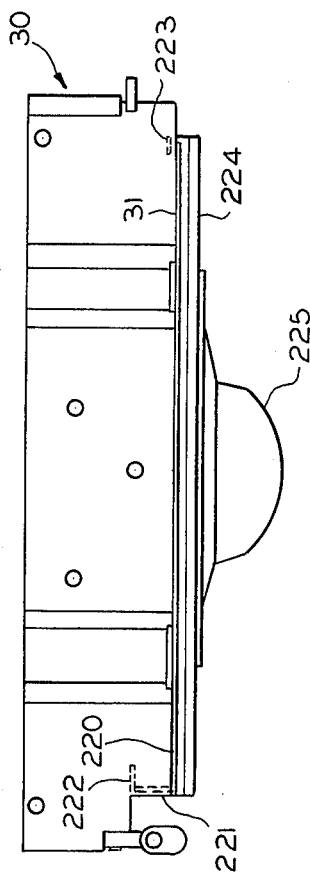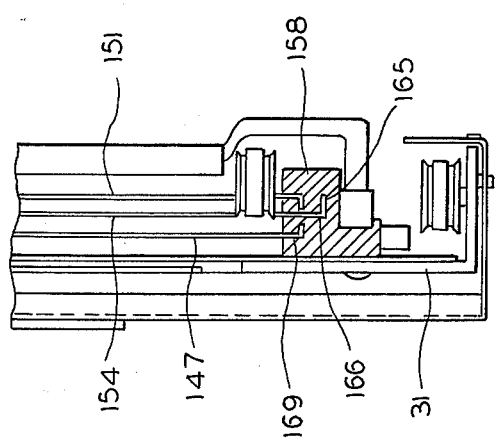

X-RAY SPOT FILM DEVICE

BACKGROUND OF THE INVENTION

This invention relates to improvements in an x-ray spot film device which is used in conjunction with an x-ray table to make a selected number of radiographic exposures on a single film and to perform fluoroscopic examinations.

Conventional spot film devices usually comprise a support or frame extending crosswise over the top of an x-ray table. A main carriage is mounted on the support for being advanced from a rearward parked postion to a frontward radiographic position wherein a cassette carried by the carriage is disposed in alignment with an x-ray beam that is projected through a patient from an x-ray source in the table. The cassette is mounted in a tray supported on an inner carriage which is translatable crosswise of the main carriage so that the center of the x-ray beam may be made coincident with the area on the film cassette on which a spot film exposure is desired. The area is further defined by superimposable masks.

As is well known, spot film devices are also provided with a fluoroscopic device which permits an examining radiologist to visualize anatomy of interest and to make one or more radiographs in a choice of sizes by projecting the cassette forward and shifting it and the masks to obtain the desired sequence of radiographs. The fluoroscopic device on the spot film device is aligned with the x-ray source in the table, and the film cassette is, of course, retracted from the beam during fluoroscopy.

When a fluoroscopic view of interest is observed, the film cassette must be projected into the x-ray beam path rapidly and one or more exposures must be taken while the fluoroscopically observed condition persists. In prior art spot film device, the main carriage which supports the inner carriage on which the film cassette is mounted is usually driven rearwardly to parked position with a unidirectional motor that moves it slowly and loads a return spring at the same time. The carriage is latched in parked position and when the latch is released the carriage is advanced rapidly under the influence of the spring and halted abruptly in the radiographic position. Rapid movement ad abrupt halt of the carriage and the masks results in considerable noise, shock and vibration that necessitate use of shock absorbing devices such as dash pots to reduce these ill effects. One problem with this system is that the main carriage must be restored to a rearward position after each exposure, to reload the spring, after which the carriage must be projected forwardly again to make the next exposure.

Some prior spot film devices have a set of tracks for the main carriage. After each exposure, the carriage is returned rearwardly and shifted to different tracks, similar to railrod car switching. Then the carriage is driven forwardly and it arrives in the proper position for the next exposure to be made. This is a relatively slow method and it requires a larger and complicated mechanism which has many moving parts.

In prior art spot film devices two x-ray field defining masks having elongated rectangular apertures disposed at right angles to each other are used. One of the masks is moved manually into the x-ray beam when two adjacent cross-wise exposures are to be made on the film. The other mask is usually carried on the palpator cone device so it and the palpator cone are disposed in the beam when two adjacent exposures lengthwise of the film are desired. Both masks and the cone are in the beam when quadrants or four exposures on one film are desired. Manual movement of the masks, in accordance with the prior art, is distracting to the radiologist and it tends to slow down the procedure undesirably.

Some prior art spot film devices dispose an x-ray anti-scatter grid permanently in the x-ray beam path. As is well known, a grid is comprised of a large number of lead strips disposed edgewise of the x-ray beam and in parallelism with each other or at predetermined angles in focused grids. A grid permits passage of x-rays which emanate from the focal spot of the source in a direct or straight line to the radiographic film or fluoroscopic device. Rays which are scattered by the equipment and by the intervening body being examined are intercepted by the lead strips and are largely prevented from reaching the film or fluoroscopic device where they may cause undesirable fogging of the image and poor sharpness.

Fluoroscopic procedures are preferably conducted with a low ratio grid or no grid. Radiographic procedures, on the other hand, are preferably conducted with a high ratio grid. In prior art apparatus where only one grid is available, a low ratio grid is usually installed since it can be used for fluoroscopy and radiography even though sharpness of the film image is not as good as it would be if a high ratio grid were used for radiography. The high ratio grid cannot be the sole grid used for radiography and fluoroscopy since it would reduce image intensity or brightness too much for fluoroscopy.

Another component of a spot film device to which consideration will be given is the palpator. The palpator comprises an x-ray permeable cone which may be advanced into the x-ray beam path during fluoroscopy. The cone may be brought down by moving the whole spot film device downwardly, to depress the patient so that the movements of an x-ray opaque material which may have been ingested by the patient can be visualized on the fluoroscopic device. On some occasions, the radiologist moves the spot film device laterally or frontwardly and rearwardly while the cone is impressed in the patient's body. This requires the radiologist, after having moved the cone carriage forwardly as in prior art spot film devices, to lock the cone so it will not slip on the spot film device while the device is being manually oscillated to effect palpation. The need for the radiologist to devote attention to moving the palpator manually and to locking and unlocking it is also distracting and slows down the procedure.

SUMMARY OF THE INVENTION

General objects of the present invention are to overcome the above defects in prior art spot film devices, to provide some new features of construction and operation for expediting radiographic spot film and fluoroscopic procedures, to minimize operational noise and vibration, and to simplify construction and operation of a spot film device.

Another object is to provide means for advancing the main carriage of a spot film device from parked position to radiographic position and retracting it to parked position rapidly and quietly with reversible servo motors that drive the main carriage and the inner carriage supported thereon in both directions to avoid the need for returning the main carriage to parked position for recocking a driving spring or switching tracks after each spot film is exposed as was required in prior art apparatus.

Still another object of the invention is to provide filed defining mask, an x-ray grid and a palpator cone device which may be translated independently of each other.

A general object is to provide stops which arrest travel of the masks and grid in the proper positions for their use and, further, to provide means for negating system inertia when travel is arrested and to provide for constraining the masks and grids against their stops, such as by keeping their drive motors energized with reduced electric power.

A further object is to provide a drive system for advancing and retracting the masks which uses a reversible servo motor for each mask and a belt which is fastened to the mask with springs that can be stretched slightly to absorb shock, incidental to rapid movement and stopping of the masks and, further, to reduce the electric power supplied to the reversible motors after the mask has reached its final position so that the motor, with reduced power thereon, will tend to maintain the mask in the correct final position regardless of the angular attitude of the spot film device.

Another object is to provide an independently translatable anti-scatter x-ray grid which may be selectively inserted in or retracted from the x-ray beam during fluoroscopy and during radiography, using a drive system that is similar to that just outlined in respect to the masks.

Yet another object is to provide a radiographic grid which is moved into and out of the x-ray beam path with the main carriage and which has a higher ratio and different orientation than the fluoroscopic grid so that, during radiography, the two grids may be used in their crosswise orientation to produce the anti-scattering effect of a high ratio grid.

Another object is to provide a palpator device which is independently movable and is advanceable and retractable into and out of the x-ray beam path using a reversible servo motor, a belt drive incorporating elastic means such as the springs mentioned above, and which uses a unique latch for holding the palpator in advanced position on the spot film device and which is releasable automatically in response to the servo motor being commanded to reverse its direction under full power.

Yet another object is to provide light weight masks which can be advanced and retracted at high speed with the application of little power and are characterized by laminations of heavy lead sheets and light weight stronger metal sheets.

How the foregoing and other more specific objects of the invention are achieved will be evident in the following more detailed description of a preferred embodiment of the invention which will now be set forth in reference to the drawings.

DESCRIPTIONS OF THE DRAWINGS

FIG. 1 is a perspective view of a typical diagnostic x-ray table with the new spot film device installed;

FIG. 2 is a plan view of the spot film device shown in the preceding figure from which the x-ray image intensifier or fluoroscopic device has beem removed;

FIG. 3 is a partial section of the margin or a door opening taken along the line 3—3 in FIG. 2 to show the elements of a tape switch that acts to prevent operation of the mechanism in the spot film device if a hand extends into the doorway during insertion or withdrawal of a film cassette;

FIG. 4 is a plan view of the upper frame or support of the spot film device which exhibits the main carriage and the inner film cassette tray carriage along with motor operated positioning mechanisms for the carriages;

FIG. 5 shows a section of a door taken along the line 5—5 in FIG. 4 which door is for inserting and withdrawing a film cassette at the front end of the spot film device;

FIG. 6 is a plan view of a latch mechanism for constraining the main carriage in its most advanced position to permit inserting and withdrawing a film cassette;

FIG. 7 is an elevation view of the latch looking in the direction of the arrows 7—7 in FIG. 6;

FIG. 8 is a plan view of the main carriage and inner carriage isolated from the spot film device;

FIG. 9 is a side elevation view of the apparatus shown in FIG. 8 looking in the direction of the arrows 9—9;

FIG. 10 is a plan view of a pan-like support and mechanism thereon which pan, in the assembled spot film device, is mounted to the bottom of the frame shown in FIG. 4;

FIG. 11 is a fragmentary view of a member that carries a palpator cone which is associated with a latch that is self-locking and automatically releasable;

FIG. 12 is a side view of the main frame shown in FIG. 4 with a part broken away to show the drive mechanism for the main carriage;

FIG. 13 is a partial section taken along the lines 13—13 in FIG. 10, to exhibit one of the tracks on which the field defining masks and an x-ray grid are guided;

FIG. 14 is a front end view of the frame, shown in FIG. 4, to which a palpator cone is attached;

Figure 17:
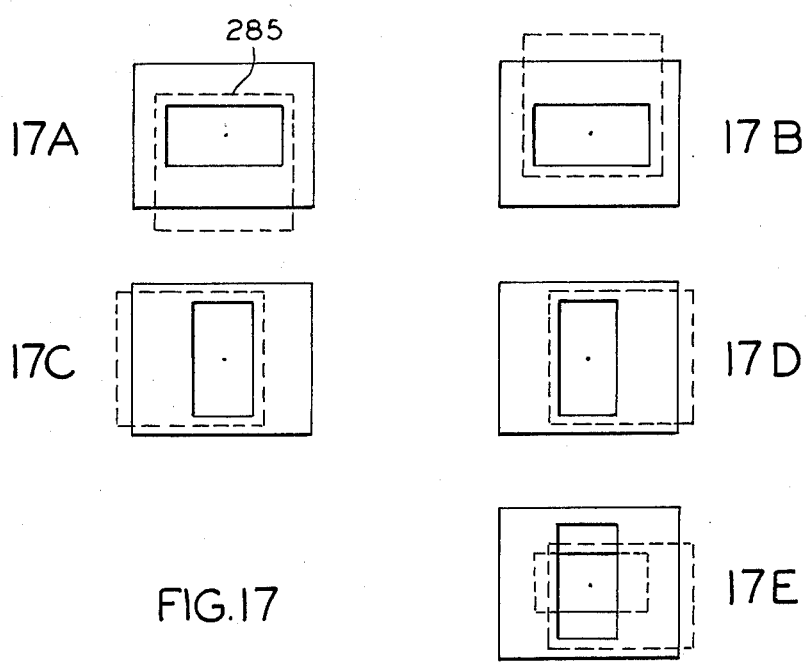

FIG. 17, comprised of parts 17A–17E, shows diagramatrically the relationship between the film cassette and the masks for obtaining exposures on front and rear halves of the film, on the left and right halves, and one of the quarter-sections of the film;

FIGS. 18 and 19 are diagrams of control systems.

DESCRIPTION OF A PREFERRED EMBODIMENT

FIG. 1 is a perspective view of a typical diagnostic x-ray table incorporating the improved spot film device. The table comprises a body 10 in which there is an x-ray source, not visible. When energized, the x-ray source projects a collimated x-ray beam through table top 11 on which a patient undergoing x-ray examination may be reposed. The top has a foot rest 12 for supporting the patient in an upright position when the table body 10 is angulated clockwise from the position in which it is shown. Table body 10 is supported from a floor stand 13 with respect to which body 10 may be angulated and translated to clear the floor with a mechanism and driving means that are not shown since they are conventional. A locking mechanism 15 holds foot rest 12 to the table top 11 in whatever position of adjustment is desired.

The x-ray source, not visible, is mounted on a carriage which is also not visible but is located within table body 10 and is adapted for being translated in opposite directions longitudinally of the body or, in other words, lengthwise of the patient. Extending upwardly from the carriage at the rear of the table is a column 16 which may be extended and contracted in the vertical direction.

The improved spot film device is generally designated by the reference numeral 17. It is supported on column 16 by means of a bearing support 18 that cooperates with a pair of tracks, such as the one marked 19, to enable the spot film device to be shifted manually to a limited extent crosswise of the table top and parked toward the rear.

Mounted to the top of the spot film device 17 and near its front is a fluoroscopic device which is generally designated by the reference numeral 20. In modern practice it is customary to use an x-ray image intensifier for fluoroscopy and the use of such a device is assumed in this case. A television camera, not shown, mounted within a housing 21 is used to display the x-ray image, obtained during a fluoroscopic procedure, on a television monitor which is not shown but is well known to those who are skilled in the art.

The control console for operating the spot film device is located at its front end and is marked with the numeral 22. The spot film device has a front opening 23 for inserting and withdrawing a film cassette at the front of the table. At the top of the device and behind image intensifier housing 20 there is another opening 24 which provides the option of inserting and withdrawing a film cassette at the rear.

Attention is now invited to FIG. 4 which shows the upper frame 30 of the spot film device and the mechanism carried thereby. These components will be described in detail soon. Before proceeding, however, attention is invited to FIG. 10 which shows some additional mechanism that is carried by a support which, for convenience, is called a pan 31. It should be understood at this juncture that pan 31 is assembled to the bottom of frame 30 in FIG. 4 so that pan and frame are substantially congruent. The two subassemblies of FIGS. 4 and 10 constitute the principal components of the spot film device.

Referring to FIG. 4, frame 30 is essentially a one piece casting of a light weight metal such as magnesium alloy. Frame 30 has a front end 32, a rear end 33 and sides 34 and 35. A pair of parallel tracks 36 and 37 are mounted within frame 30. A first carriage, herein called a main carriage 38 runs on tracks 36 and 37. Main carriage 38 may be retracted to parked position which is somewhat rearward of the position in which it is shown. It may also be advanced frontwardly to where it becomes aligned with central ray of an x-ray beam projecting upwardly from the x-ray source in the table body. The location of the central ray is marked 39 in FIG. 4.

Main carriage 38 has sides 40 and 41 which may be provided with rollers and sleeve bearings, not visible, or other linear bearing means for cooperating with tracks 36 and 37. Mounted on main carriage 38 is a second carriage, herein called to the inner carriage 42. Inner carriage 42 is movable crosswise of main carriage 38 between the limits determined by sides 40 and 41 of the main carriage.

The inner carriage translates on rollers, not visible, which extend from side 43 and engage tracks in side 44 of the main carriage. The inner carriage is further guided on linear bearings that cooperate with a rod 45 which is attached at opposite ends 46 and 47 to opposite sides 40 and 41 of main carriage 38. One of the linear bearings which is located in the portion of inner carriage marked 48 in FIG. 4 may be seen in FIG. 8 where the bearing is marked 49. The roller bearings 50 and 51 for inner carriage 42 are also visible in FIG. 8.

The inner carriage 42 is provided with a tray for holding a film cassette which will be discussed in more detail later. As in many prior art spot film devices, the film cassette is carried forward by the main carriage and shifted crosswise thereof to make the central x-ray 39 coincide with an area of the film on which an x-ray exposure is to be made.

One distinguishing feature of the new design is the manner in which the main carriage 38 is advanced to radiographic position in coincidence with central ray 39 and retracted to parked position toward the rear of frame 30. In a commonly used prior art design, the main carriage is retracted to parked position with a motor drive while loading a spring at the same time. When the carriage is unlatched, it is projected forwardly to radiographic position with energy stored in the spring. In other prior designs, the main carriage is retracted, shifted to different tracks and advanced again, using a motor to drive in both directions.

In the new design shown in FIG. 4, the main carriage is advanced and retracted in both directions exclusively with the power obtained from a reversible servo motor 55 that is mounted to the end member 33 of frame 30. The motor drives a belt 56 which is coupled to the main carriage and translates it either forwardly or rearwardly, depending on the rotational direction of the motor. In FIG. 12, frame 30 is broken away to show a profile of the main carriage drive system. Considering FIGS. 4 and 12 together, one may see that belt 56 is essentially an open loop whose ends 57 and 58 are clamped to posts 59 and 60 which are fastened to main carriage 38. Belt 56 runs on a drive pulley 61 and an idler pulley 62 which is spaced from the drive pulley by a distance that is substantially coextensive with the travel distance of main carriage 38. In FIG. 12, it is apparent how a row of studs such as the one marked 63 support the track 37 on which the linear bearings 64 and 65 of the main carriage 38 glide. Linear bearings 64 and 65 are closely fit to track 37 so the carriage follows a perfectly straight line when it is advanced and retracted.

Use of a reversible motor, pulleys and a belt to translate the main carriage is to be considered illustrative rather than limiting. It is, for example, within the scope of the invention to use a motor driven lead screw or other suitable means to translate the carriage.

Referring again to FIG. 4, a potentiometer 66 is provided for producing a signal which corresponds with the position of main carriage 38. Motor pulley 68 drives a belt 72 which drives a pulley 61. There is a common journaled shaft for pulley 67, pulling 61 and a pinion 69. Pinion 69 drives a reducing gear 70 which is on the same shaft as is potentiometer 66 so potentiometer 66 is driven to angular positions corresponding with the linear distance travelled by main carriage 38. Commands for running motor 55 to advance and retract main carriage 38 and signals derived from potentiometer 66 for sensing the position of the carriage are coordinated in a program controller not shown, and which is remotely located together with a servo amplifier to provide a position servo system.

The drive mechanism for shifting inner carriage 42 alternately on main carriage 38 as required for exposing selected areas on the film will now be described primarily in reference to FIG. 4.

Inner carriage 42 is translated selectively with a reversible servo gear motor 75 located near the rear end of main frame 30. The motor is mounted on a bracket 76 which is fastened to rear end 33 of the frame. Mounted directly on the shaft of gear motor 75 is a cable sheave 77 which has grooves for accommodating a cable whose opposite runs are marked 78 and 79 at the rear of frame 30. The cable makes several turns around sheave 77. Cable run 79 extends around an idler pulley 80 from which it runs over a pulley 81 that is journaled for rotation on main carriage 38. The cable continues around a pulley 82 which is journaled for rotation on inner carriage 42. The cable then continues around a pulley 83 on the main carriage after which it extends around a grooved pin 84, on which there could be another pulley, after which the cable continues to a tension adjusting screw 85 to which it is attached. Cable run 78 similarly extends around an idler pulley 86 and continues around a pulley 87 on main carriage 38 pulley 88 on inner carriage 42, pulley 89 on the main carriage and then around pin 90 after which it loops back to a tension adjusting screw 91 to which it is attached.

When servo motor 75 is commanded by a second position servo system, not shown, to rotate in one direction such as to cause sheave 77 to rotate clockwise as viewed from the rear end, cable run 78 will be placed in tension and will tend to wind on sheave 77. This will shorten run 78 of the cable and will result in inner carriage 42 being pulled toward the observer in FIG. 4. At the same time, cable run 79 will unwind from sheave 77 correspondingly so that the loop of cable passing around pulley 82 on the inner carriage will be extended in response to the inner carriage 42 being pulled toward the observer.

A unique feature of the system which has just been described is that use of a reversible servo motor 75 permits translating the inner carriage 42 while the outer carriage is in transit toward radiographic position in which case the cassette will be in proper position for conducting radiography by the time it arrives in its advanced position. Moreover, the inner carriage and a cassette thereon may be translated while the outer carriage is in motion to the desired position for removing a cassette from the rear of the spot film device. In addition the system permits multiple exposures to be made without the need of the carriage to return to the rear film loading position between exposures.

Referring to FIG. 4, one may see that there is an x-ray anti-scatter grid 92 mounted on the bottom of the inner carriage. A portion of the top face of the grid is broken away to show the orientation of its lead x-ray attenuating strips 93 which appear edgewise and extend along the direction in which the main carriage moves. This grid is, of course, only disposed in the x-ray beam for radiography with the film cassette. Later there will be discussion of how grid 92 cooperates with another grid to enable cross-grid radiography with reduced x-ray scattering and film fogging. Cross-grid radiography is discussed in the magazine RADIOLOGY, Volume 115, pages 732–733, June, 1975, in an article by Skucas et al. entitled "New Grid Design for a Fluoroscopic Spot Film Device".

In FIG. 8, the inner carriage 42 is shown isolated from main carriage 38 to facilitate a more detailed description of the inner carriage. Mounted on the inner carriage 42 is a cassette tray 95 comprised of frame members 96, 97 and 98 on which a conventional flat cassette, not shown, may be supported. The frame members define a rectangular window 99 for the x-ray beam which projects upwardly from the source in the table body to expose a film in the cassette after having passed through the table top, a patient and grid 92. Cassette tray 95 is movable in parallel with side members 100 and 101 typically with linear bearings such as 125 adapted to slide on a rod 124. Means are provided for advancing cassette tray 95 to the position on inner carriage 42 in which it is shown in FIG. 8 to enable insertion and withdrawal of a cassette from the front end of the spot film device. When a cassette is in tray 95 and is ready for radiographic purposes, cassette tray 95 is normally shifted to a position more to the right in inner carriage 42 than the position in which it is depicted in FIG. 8. When main carriage 38 is driven to its most advanced cassette loading and unloading position at the front of the frame 30 in FIG. 4, the tip 102 of a plunger rod 103 strikes the front end 32 of frame 30, causing the rod to be forced rearwardly as shown in FIG. 8. The rear end of rod 103 has an arm 104 on which there is a pivot pin 105. An articulated linkage comprised of links 106 and 107 makes a connection between pin 105 and a sliding pin 108 which extends from near the end of link 107. Link 107 swings on pivot pin 112. When the cassette tray 95 is retracted, sliding pin 108 is positioned at end 109 of a slot 110 which is in flange 111 extending from the cassette tray. When link 107 pivots on a shaft 112 carried by a bracket 113, pin 108 slides in slot 110 and rotation of link 107 forces tray 95 forwardly to the cassette loading and unloading position in which it is shown in FIG. 8.

As can be seen in FIG. 9, plunger rod 103 has a shoulder 114 on it. Rod 103 slides through a bearing 115. A coil spring 116 is captured between shoulder 114 and the stationary bearing 115. This spring is compressed by the plunger rod when the carriage is driven to its most forward position. When the carriage is driven rearwardly, after having had an exposed film cassette removed and unexposed film cassette inserted in tray 95, spring 116 restores plunger rod 103 to its extended position as it appears in FIG. 4.

Extending from cassette tray 95 are a pair of arms 117 and 118. Arm 118 is terminated with a door striker 119 which, as can be seen in FIG. 9, has a beveled surface 120 constituting its tip. When the main carriage 38 moves to its most frontward position on frame 30 as shown in FIG. 4, beveled tip 120 strikes a door 121 and causes it to open so that a film cassette which has been advanced enough to extend through the door by action of plunger rod 103 can be grasped with fingers for removal. The door, of course, remains open until the main carriage is retracted.

Door 121 is shown in section in FIG. 5 and is seen to comprise a triangularly formed stiff metal sheet 122 which has a lead strip 123 backing it for the purpose of attenuating stray x-radiation. The door is maintained in the closed position in which it is shown in FIG. 5 with a torsion spring 127.

After having advanced main carriage 38 to its most forward position for loading or unloading a film cassette, servo motor 55 is de-energized. A latch is provided for preventing carriage 38 from being propelled rearwardly by the energy stored in compressed coil spring 116 which surrounds plunger rod 103. The latch is shown in FIGS. 6 and 7. It comprises a bell crank 130 carried by a pivot shaft 131 that is supported on the leg 132 of a bracket 133 which has another leg 134. Bracket 133 is fastened on the inner side of main frame side member 34 along the path of travel of main carriage 38. Bell crank 130 has a cam roller 135 and it is biased to the position in which it is shown in FIG. 7 with a spring 136. In FIG. 7, a fragment 137 of a cam which has two beveled spaces 138 and 139 is shown. This cam is mounted on the bottom of side 40 of carriage 38. When the cam translates with carriage 38 to its cassette loading and unloading position, its beveled surface 138 strikes roller 135 and rocks the bell crank such that roller 135 is subsequently engaged by beveled surface 139 of the cam. Carriage 38 is thereby held forwardly or to the right in FIG. 7 but it can be retracted by operating main carriage drive motor 55 in its reverse direction such that it provides sufficient power to overcome the camming force of spring 136 in which case the carriage 38 is driven rearwardly by the motor.

The unique manner in which the x-ray image field defining masks are constructed and driven will now be described in reference to FIG. 10. As mentioned earlier, the spot film device is made in two major assemblies, one of which comprises support means called a pan 31 which is mounted to the bottom of main frame 30. The pan may be mounted with screws inserted through holes such as those marked 145 and 146 in the margin of the pan in FIG. 10.

In FIG. 10 the x-ray beam as modulated by the image would be coming up from the bottom of the pan when the spot film device is extending over the x-ray table top, the point at which the central ray of the beam comes up is marked 153.

In FIG. 10, there is a lower planar mask 147 which has a rectangular aperture 148 for defining an x-ray field. The leading edge of mask 147 is marked 149 and its trailing edge is marked 150. There is also an upper mask 151 which has an aperture 152 for defining an x-ray field. Rectangular aperture 152 has the same shape and size as rectangular aperture 148 in mask 147 but the long dimension of the aperture 152 in mask 151 is perpendicular to the long dimension of aperture 148 in mask 147.

Between upper mask 151 and lower mask 147, there is another planar anti-scatter x-ray grid 154 which has a corner broken away to show that its lead strips 155 are directed crosswise of the lead strips 93 of grid 92 in FIG. 4. Grid 154 is selectively movable in and out of the x-ray beam as will be explained later. The leading edge of grid 154 is marked 156 and its trailing edge is marked 157.

Masks 147 and 151 and grid 154 are mounted for translating on a pair of tracks 158 and 159 which are arranged in parallelism near opposite margins of pan 31. Grid 154 is mounted on an apertured metal plate 169 which has co-planar tongues 161 and 162 extending from it on the same edge. It also has tongues 163 and 164 extending from its opposite edge. Typical of tongues 163 and 164, their margins 165 are bent upwardly to form an L-shaped cross-section. Referring to FIG. 13 where a section of tracks 158 are shown, it will be seen that the track has a guide slot 166 which is also L-shaped and is complemented by tongues 163 and 164. One of the tongues is marked 165 in FIG. 13 as it is in FIG. 11. Use of the angularly bent tongues assures that the grid will not shift laterally when sliding in the grooves of the tracks.

The side of mask 147 also has tongues or extensions 167 and 168 which have L-shaped cross sections. A cross-section of track 159 is not shown but it will be understood that it has complementary L-shaped grooves in which the L-shaped tongues of the mask glide. Extensions 169 and 170 from the other side of mask 147 are planar and it will be seen in FIG. 13 that the planar tongue 169 slides in a corresponding planar groove in track 158. Mask 151 also has similar tongues which function in the manner just described in respect to mask 147. A more detailed description of the structure of the masks will be given later in reference to FIG. 15.

The manner in which masks 147 and 151 and cross-grid 154 are advanced to radiographic position and retracted to parked or inactive position, will now be described in reference to FIG. 10, primarily. There is a reversible servo motor for the lower and upper masks and the grid, respectively. Motor 175 drives or translates upper mask 151. Motor 176 drives lower mask 147. Motor 177 drives grid 154.

Consider the upper mask drive system first. It comprises a sprocket-like pulley 178 on the shaft of motor 175. Situated near the front end of pan 31 is an idler pulley 179 which is mounted for rotation on a bracket 180. Running on drive pulley 178 and idler pulley 179 is an open loop belt which has opposite ends 181 and 182 that are connected to the leading and trailing edges of mask 151 with coil springs 183 and 184, respectively. Hence, operation of motor 175 in one direction will retract mask 151 to parked position and rotation of the motor in an opposite direction will advance mask 151 to the front of the spot film device, that is, to the left in FIG. 10, for use in fluoroscopy if desired and for cross-grid radiography.

Disposed in the path of the masks and the grid at the front end of pan 31 is a limit switch assembly 186 which has several plungers in different planes. Two of the plungers which are superimposed over the others are marked 187 and 188. Depression of the plungers operates limit switches, not visible, in assembly 186. A stop 189 is also provided for accurately determining the maximum travel of the masks and grid. Stop 189 may have a metal face and a resilient backing to minimize noise and shock.

By way of example and not limitation, in a commercial design the leading edge, such as edge 190 of mask 151, strikes plunger 187 and operates a limit switch about 0.2 of an inch before the mask hits stop 189. Substantially full rated electric power is applied to servo motor 175 while it is driving mask toward the stop 189. When leading edge 190 of mask 151 strikes the plunger 187, however, the accompanying operation of a limit switch results in the power applied to servo motor 175 being reduced substantially. Typically, in a commercial embodiment, the power on servo motor 175 is reduced to about one-tenth of power that is applied when the motor is driving the mask through most of its travel. The reduced power on motor 175 is continually applied so that the leading edge of the mask is held firmly against stop 189. Hence, even when the spot film device is tilted with the x-ray table, the mask is held firmly against the stop by the motor in opposition to the force of gravity acting on the mask. The circuitry which responds to actuation of a limit switch by reducing power on the servo motor can be devised easily so it is not described for the sake of brevity.

When a mask is driven against stop 189 incidental to the momentum of the system, the elastic coil springs 183 and 184 in the drive belt are stretched by a small amount such that they contribute further to absorbing shock but loading of the springs does not result in any recoil since the servo motor remains energized at a reduced power level. Thus, the system has the merits of smooth and quite operation.

Coil springs 183 and 184 do not necessarily have to be directly coupling the ends of the belt and the masks. They could be located at other points in the belt as long as they do not run over the pulley. An elastic section might also be inserted in the belt or, in some cases, a belt with just the right elastic properties might be used. In a commercial embodiment, a rubber belt having teeth on its running surface was used and pulleys 178 and 179 have corresponding sprocket teeth to assure positive drive and to assure that shock will be absorbed by slightly stretching the springs which couple the belt ends to the mask.

It should be noted that leading edge 190 of mask 151 has a notch 192 which allows the advancing mask to clear and not actuate plunger 188 while desirably actuating plunger 187 of the limit switch assembly.

When the mask 151 is driven to its most retracted or parked position, it encounters another limit switch assembly 195 which has a set of plungers including those marked 196 and 197. At the end of its retracted travel, the rear edge 191 of mask 151 strikes plunger 196 to actuate a limit switch which results in reducing the power applied to servo motor 175. Again, the belt coil spring that is in tension when the edge 191 strikes a stop 198 is stretched or loaded slightly to absorb shock. Edge 191 of mask 151 has a notch 199 so that striking of plunger 197 can be avoided when plunger 196 is to be depressed.

The drive system for lower mask 147 is similar to that for mask 151 which has just been described. Thus, there is a reversible servo motor 176 for driving lower mask 147. There is a pulley 200 on the motor shaft and an idler pulley 201 spaced from it and there is a belt loop whose upper run is separated into two parts 202 and 203 to enable coupling the ends of the belt to the mask with elastic means such as springs 204 and 205. One edge of lower mask 147 has a notch 206 so it will avoid actuating plunger 188 while actuating plunger 187 during advancement toward stop 189 and it has a notch 207 in its rear edge so it will avoid actuating plunger 197 while operating plunger 196 before striking stop 198 when it is being retracted. As in respect to upper mask 151, when the lower mask 147 reaches either limit of its travel, reduced power is applied to servo motor 176 and the mask is held securely against a stop.

X-ray grid 154 is driven in a fashion similar to that of the masks with its individual reversible servo drive motor 177. Thus, the drive shaft of motor 177 has a pulley 210 which drives a belt 211 over a remotely spaced idler pulley 212. As in the case of the masks, belt ends are attached to opposite edges of the grid with coil springs 213 and 214.

The leading edge 215 and the trailing edge 216 of grid 154 operate limit switches in assemblies 186 and 195, respectively, near the end of their travel in the advanced or retracted direction and cause reduced power to be applied to servo motor 177. As in the case of the masks, full power is immediately applied to the servo motor when operation in the reverse direction is commanded so that the grid will travel over most of the distance at top speed.

From the description thus far, those skilled in the art will recognize that the radiologist has the option of advancing np masks, one mask or both masks for radiography and the further option of either advancing or not advancing the grid into the x-ray beam for fluoroscopy. The option of not advancing grid 154 or advancing it to perform cross grid radiography in cooperation with grid 92 on the bottom of the carriage is also provided.

Recapitulating, fundamental concepts of the mask palpator and grid drive systems are to have the masks, palpator and grids come to a definite stopping position at a reasonable speed and to remain in that position until the servo motor is commanded to drive in the reverse direction. This is implemented in the preferred embodiment by reducing the power on the drive motor an instant before the mask, grid or palpator hits a stop. The motor and drive system has inertia, however, which would result in a sharp impact but this is negated by permitting the motor to overtravel and load a spring which holds the movable devices against the stop. Overtravel might also be obtained by other means such as by driving through a slip clutch, not shown, instead of using an elastic belt or connecting a belt to the movable devices with springs. Reduced power on the drive motors can still be used advantageously to hold the movable devices against the stop. If no springs or other elastic means are used, the shock on the system may be so great that the drive motor shafts or other components such as pins or keys might shear.

Attention is now invited to FIGS. 10 and 14, primarily, for a description of the palpator means and its driving system. FIG. 14 shows the upper or main frame 30 of the spot film device with the lower support means or pan 31 fastened to the bottom of the main frame. The palpator comprises a centrally apertured plate 220 which has an upstanding margin 221 and an inwardly bent portion 222 on one side. It also has an inwardly bent portion 223 on its other side. Inwardly bent portions 222 and 223 serve as bearings on which the palpator may be advanced to fluoroscopic position and retracted to parked or inactive position. The palpator is provided with a support plate 224 on which an x-ray transparent cone 225 is mounted for use in a well-known manner.

In FIG. 10, the leading and trailing edges 226 and 227 of plate 220 appear as dashed lines while the over-hanging margins 222 and 223 appear as solid lines. The palpator assembly is advanced and retracted with its individual reversible servo motor 246 located in the rear portion of pan 31 as are the other servo motors 175, 176, and 177 for the masks and grid. The drive system for the palpator is similar to that of the masks and grid. It comprises a pulley 247 on the shaft of motor 246 and an idler pulley 228 on which a belt having ends 229 and 230 runs. The belt ends are coupled to the palpator with springs 231 and 232. The palpator drive system employes the feature of reducing power on its servo motor 246 when the palpator reaches either of its travel limits.

When the spot film device is lowered toward the patient to enable applying a force on the patient with cone 225, the radiologist sometimes desires to move the palpator through short distances crosswise of the table in order to urge portions of the anatomy in the desired manner for a fluoroscopic study. This is usually done by shifting the whole spot film device, basically the upper frame 30, on its supporting tower at the back of the x-ray table. Hence, the palpator must be locked against travel on the spot film device during this procedure.

A unique locking device which requires no conscious manual activity nor solenoid operator to release it is provided. Refer to FIG. 11. When the palpator is driven as far as it will go to the left as it appears in that figure it will hit a stop, not shown, which will prevent it from shifting any further in that direction. It could, however, shift to the right undesirably but for the latch device which is shown in FIG. 11. A bracket 235 shown attached to the palpator in FIG. 11 serves as a means for coupling the end 230 of the belt to the palpator with a spring 231. The palpator has another bracket 236 mounted on it. Mounted on bracket 236 with a pivot pin 237 is a latch arm 238. The pivotal latch arm has a beveled cam surface 239 and a hook portion 240. Bracket 236 and latch arm 238 travel with the palpator. A first spring 241 is coupled between a pin 242 on the latch arm and a pin 243 on the bracket. Spring 241 normally tends to rotate latch arm 238 in the clockwise direction as shown in FIG. 11. The hooked end 240 of the latch arm is adapted to engage a stationary pin 244 which is located appropriately along the path of travel of the palpator. Assume that the palpator moves in the direction of arrow marked 245 in FIG. 11 when the palpator is being driven to its active position wherein locking it is desired. When it reaches active position, cam surface 239 on latch arm 238 will strike stationary pin 244 to overcome the force of spring 241 so the hook 240 will engage with pin 244 and prevent the palpator from being moved in a direction that is opposite to that of arrow 245. Upon this event, spring 231, which couples the belt end 230 to the palpator will be slightly stressed and reduced power may be applied to the palpator drive motor.

Now assume that the operator desires to restore the palpator to its retracted or parked position, which means moving it to the left as it appears in FIG. 11. All that is necessary is to command palpator servo motor 246 to drive in the reverse direction in which case belt end 229 is placed in tension and coupling spring 232 is stressed. Coupling spring 232 is hooked onto pin 242 of the latch arm so that when it is put in tension, latch arm 238 is caused to rotate through a small angle in a counterclockwise direction to release the hook 240 from stationary pin 244. In other words, the tension on the belt develops a force that is counter to the biasing force of first spring 241. The fulcrum between pivot pin 237 and spring attaching pin 242 is the same for first spring 241 and the second spring 232 so it should be evident that the second spring 232 which is in series with the belt must be the stiffer of the two springs or it would stretch when the belt is tensioned without releasing the latch arm. Thus, it will be seen that simply operating palpator drive motor 246 to put spring 232 in tension will overcome the latchin force of spring 241 and will release the latch.

Figure 15:
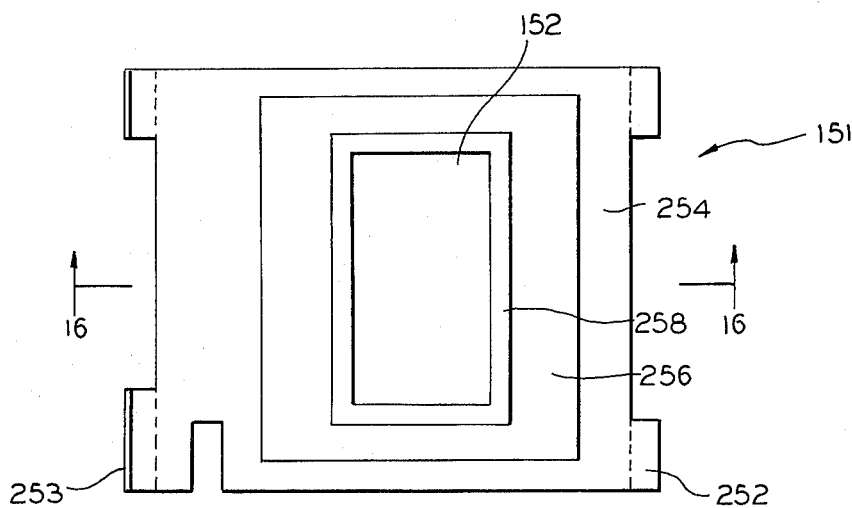
FIG. 15 is a plan view of one of the apertured x-ray field defining masks.
Figure 16:
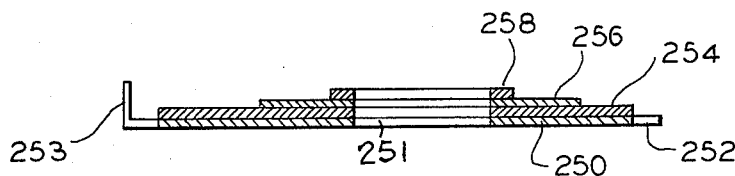
FIG. 16 is a section of the mask taken along the line 16—16 in FIG. 15.

The unique construction of the masks will now be described with reference to FIGS. 15 and 16 which show one of the masks 151. The mask is made in a laminar fashion so it will have light weight strength and yet have sufficient x-ray attenuation in the proper areas to cut off undesired portions of the x-ray beam and define a sharp field. Referring to FIG. 16, the bottom plate which must span a substantial distance between the tracks on which the masks slide, is made of a stiff sheet metal such as steel identified by the number 250. It has a rectangular aperture that is congruent with aperture 152 in FIG. 15. Plate 250 also has a planar margin 252 and an upstanding margin 253 which fits into a complementarily shaped groove in the track for the masks and prevents sidewise shifting, as described earlier. The next layer is a sheet of lead 254 which also has a congruent rectangular aperture. Bonded to top surface of lead sheet 254 is another thinner steel sheet 256 which has an aperture that is congruent with the others. Finally, top layer is a lead sheet 258 which has lesser external dimensions than the sheets or plates on which it is superimposed, but it has an aperture of similar shape. Metal sheets, 250, 254, 256, and 258 are bonded at their interfaces with a rigid epoxy resin to form a unitary mask. Bonding two stiff metal layers to opposite sides of a soft metal layer results in a beam which has the soft layer lying on the neutral bending axis and the stiff layers spaced therefrom so the modulus of the beam is high.

Substantially, the same stiffening effect may be obtained if the sheets are stacked in a different sequence. For example, the soft lead and highly x-ray absorbent sheet 254 could be bonded to the bottom of steel sheet 250 and steel sheet 256 could be bonded to the bottom of it while narrower lead sheet 258 could be bonded to its topsheet 252.

Note that the width of the sheets or plates comprising the mask become narrower progressing upwardly. The wide lead sheet 254 intercepts most of the stray radiation laying outside of the collimated beam which comes up from the x-ray source. The next steel sheet layer 256 is narrower since it is employed primarily for stiffening the mask in its central section where the lead sheet needs it most to avoid sagging. The margin of the top lead sheet 258 is quite narrow and only has sufficient width for intercepting any radiation that might result from inacurracy in the setting of the shutters of the collimator, not shown, which is associated with the x-ray source in the table body.

As mentioned earlier, the spot film device is designed for permitting loading and unloading of a cassette from the front or from the rear. A safety feature for rear loading will now be described in reference to FIGS. 2 and 3. FIG. 2 shows a plan view of the spot film device 17 with the fluoroscopic device 20 removed. Ordinarily, the fluoroscopic device is coupled to an apertured plate 265. This view also shows the handle 266 which may be used by the radiologist to cause the spot film device to be driven lengthwise of the x-ray table body. Another handle 267 is provided for manipulating the spot film device as required when the x-ray table is tilted to place the patient in an upright position.

In FIG. 2, the opening for inserting and withdrawing a cassette from the rear of the spot film device is marked 268. The opening must be entered to actuate an operating lever for lifting the cassette out of the tray. This is a simple lever which is shown in FIG. 8, where it is marked 269. It has a flat extension 270 which causes the cassette to be lifted when a handle 271 is grasped for pivoting the lever. Also shown in FIG. 8 is a detent device 272 which holds the cassette in place. The detent has a plunger 273 acted on by a spring 274 which is captured by a cap 275. The tip 276 of the plunger 273 is beveled as a two sided wedge so that when a cassette frame is pushed into cassette tray 95, the beveled tip will recede and then pass over the cassette to secure it in place under the influence of spring 274. A sufficient upward force on the cassette developed manually with lifting lever 269 will overcome the force of spring 274 and allow the cassette to be removed.

Referring to FIG. 2, one may see that the opening 268 has tape switches 277 and 277' at its margins. One of the tape switches is shown in section in FIG. 3. It comprises a flexible rubber cover 278 which supports a strip 280 of a conductive material such as spring brass which has a concave cross section. The metal strip 280 constitutes an electric contact. There is another metal strip 280' mounted on rubber 282 which serves as another contact. Normally, metal contact strips 280 and 280' are electrically isolated by thin insulator strips 281 and 281' and by an air space 283. A thick sponge strip 284 supports the tape switch. The sponge affords further resilience. When a force is applied to rubber cover 278, such as when an operator's hand is inserted through the cassette opening or hatch 268, the cover deforms and causes metal strip 280 to make electric contact with metal strip 280'. By closing a circuit in this manner, a relay device, not shown, may be operated to cause driving circuits to all motors to be opened so that no mechanism can be moved or operated when a hand is in contact with an edge of the cassette opening.

FIG. 17, comprised of parts 17A – 17E, shows various ways in which the film cassette may be shifted relative to the masks to expose different areas of the film and to make exposures of different sizes.

In FIGS. 17A and 17B, the mask is advanced the same radiographic position for exposing the rear and front halves of the film. The film is outlined in dashed lines marked 285. In FIG. 17A, the film projects forwardly of the mask aperture so the rear half of the film can be exposed. In FIG. 17B, the film is shifted rearwardly for exposure of its front half. The two exposures are made by positioning the main carriage forwardly and then taking a step rearwardly.

FIGS. 17C and 17D show how two lengthwise halves of the film may be exposed sequentially by exposing the right half as in 17C and then shifting the film by moving the inner cassette to expose the left half as in FIG. 17D.

In FIG. 17E, the masks shown in 17B and 17D are superimposed so that their rectangular apertures are cross wise and in the example which is shown in 17E, the film is positioned for exposing the upper left quadrant or corner area. As is well known, the film may be shifted three more times to expose its remaining three quarter-sections.

For fluoroscopy, the masks are retracted from the x-ray beam but the independently movable grid 154 may or may not be inserted in the beam.

A block diagram of the servo system for positioning the main carriage 38 is shown in FIG. 18. A similar system is used for driving the inner carriage 42. In FIG. 18, the main carriage motor is marked 55 and the potentiometer for sensing the position of the carrige is marked 66, consistent with their markings in FIG. 4. Motor 55 is driven from the output of a power amplifier 300 which is supplied from an operational amplifier 301. An input to amplifier 301 connects to a summing junction 302. A signal indicative of the instantaneous position of carriage 38 is supplied to junction 302 from the output of a differential amplifier 303. The signal corresponding with carriage position is supplied to amplifier 303 from position sensing potentiometer 66.

Any desired position of the carriage is obtainable by grounding one of several input terminals such as 304 and 305. A different signal is supplied to summing junction 302 for each carriage position desired. A potentiometer 306 is used to develop a signal that corresponds with one desired position of the carriage, for instance, its most advanced position. The wiper of potentiometer 306 is connected through a resistor 307 to field effect transistor 308. The output of transistor 308 connects to summing junction 302. When gate 309 is grounded, a signal corresponding with the desired position is delivered to junction 302 and the carriage is moved until the signal from position sensing potentiometer 66 balances it and motor 55 stops driving. Another typical position is the parked position of the carriage which is obtained by grounding input terminal 305. It similarly turns on a field effect transistor 310 which conducts a corresponding position signal from a potentiometer 311 which has a resistor 312 between its wiper and the transistor.

A control circuit, typical of that used for the motors that drive the masks 147 and 151 and the grid 154 is shown in FIG. 19. One of the mask drive motors 175 is used for an example. Motor 175 is a reversible d-c motor. It is mechanically coupled to mask 151 as symbolized by the dashed line 320.

The control circuit comprises a relay coil K1 connected between a d-c source terminal V and ground G. The coil has a switch SW3 in series with it. As shown in FIG. 19, when switch SW3 is open, the mask 151 is driven to its parked position. When the switch is closed, the mask is driven to radiographic position. Relay K1 controls contacts K1A, K1B, K2A and K2B. The state of the contacts as shown in FIG. 19 corresponds with the mask being in parked position. If switch SW3 is now closed, coil K1 is energized and contacts K1A and K1B open. K2A and K2B close. This provides a circuit for driving motor 175 in one direction. Current flow under these conditions is from terminal V through a series circuit in the sequence of contact K2A, diode D1, limit switch SW2, motor 175, and contact K2B to ground G. When the mask reaches radiographic position, it operates a plunger in the limit switch assembly 186 in FIG. 10, which plunger is marked 321 in FIG. 19. Actuation of plunger 321 results in limit switch SW2 opening to de-energize the motor. However, since contact K2A has remained closed, a resistor R1 is connected in series with motor 175 for reducing its power as compared with the power applied to the motor before plunger 321 is struck. Thus, when mask 151 stops in its final position against stop 189, reduced power is maintained on the motor.

Motor 175 is caused to drive mask 151 to parked position by opening switch SW3. The contacts then assume the states in which they are shown in FIG. 19. In this case, current flows from supply terminal V through contact 1A, motor 175, diode D2, limit switch SW1 and contact K1B to ground. This direction of current flow results in motor 175 operating in the reverse from the preceding example. When the mask reaches parked position it strikes a plunger 322 before hitting stop 198 and limit switch SW1 opens. Since contacts K1A and K1B remain closed, reduced power is again applied to motor 175 by reasons of resistor R1 being in series with it between terminal V and ground.

We claim:

1. For use with a diagnostic x-ray table including a table body, an x-ray source in the body and a table top for supporting an examination subject in the path of an x-ray beam from the source, a spot film device adapted to be located on a side of the table top remote from the source, said spot film device comprising:

support means for extending crosswise of said table top, carriage means mounted for translating on said support means between an inactive position and a radiographic position, means on said carriage means for holding a cassette, a generally planar first x-ray grid means mounted to said carriage means for being interposed between said x-ray source and a cassette when said carriage means is advanced to radiographic position, a second x-ray grid means mounted for movement on said support means between a retracted position and an advanced position where said second grid means may be used alone for fluoroscopy or jointly with said first grid means for radiography, said second grid means being disposed orthogonally relative to said first grid means, means for accommodating a fluoroscopic device in alignment with the path of said beam from said x-ray source, means including reversible motor means and means operatively coupling said motor means to said second grid means for selectively advancing said second grid means alone to perform fluoroscopy or jointly with said carriage and said first grid means to perform radiography and alternately maintaining said second grid means and carriage in retracted position to permit fluoroscopy without any grid means in said x-ray beam path, drive pulley means driven by said reversible motor means, idler pulley means spaced from said drive pulley means, stop means for limiting travel of said second grid means, said means for coupling said motor means to said second grid means comprising belt means running on said idler and drive pulley means, said belt means having opposite end portions connected to said second grid means and said belt means having an elastic characteristic for enabling said belt means to yield and absorb shock and allow overtravel by said motor means when said second grid means is stopped abruptly by said stop means, and means responding to said second grid means reaching a position near said stop means by reducing the electric power supplied to said motor means and by maintaining said reduced power for holding said grid means against said stop means.

2. The device as in claim 1 wherein spring means are interposed between each of said opposite ends of said belt means and said second grid means for obtaining said elastic characteristic.

3. For use with a diagnositic x-ray table including a table body, an x-ray source in the body and a table top for supporting an examination subject in the path of an x-ray beam from the source, a spot film device adapted to be located on a side of the table top remote from the source, said spot film device comprising:

support means for extending crosswise of said table top, carriage means mounted for translating on said support means between an inactive position and an active radiographic position, means for holding a radiographic cassette on said carriage means, mask means mounted on said support means for being translated crosswise of said table top selectively into and out of the path of the beam from said x-ray source, said mask means having an aperture for defining the beam impinging on a cassette in said means for holding a cassette, reversible motor means, drive pulley means driven by said motor means, idler pulley means spaced from said drive pulley means, belt means translating said mask means and running on said drive pulley and idler pulley means, said belt means having opposite end portions connected to said mask means, stop means for limiting the movement of said mask means, said belt means having an elastic characteristic for enabling said belt means to yield and absorb shock and allow overtravel by said motor means when said mask means is stopped abruptly by said stop means, means responding to said mask means reaching a position near said stop means by reducing the electric power supplied to said servo motor means and then maintaining said reduced power for holding said mask means against said stop means.

4. The drive as in claim 3 including spring means for obtaining said elastic characteristic, said spring means being interposed between each of said opposite end portions of said belt means and said mask means.

5. The device as in claim 3 including:

track means for said mask means, and said mask means comprises a substantially planar member having said aperture therein, said planar member having opposite first and second margins which run on said track means, at least said second margin being at an angle relative to said planar member, said track means comprising first and second track members that are spaced apart and parallel to each other, said first track member having a groove which is shaped complementarily to said first margin to enable said first margin to slide in said groove and said second track member having a groove which is shaped complementarily to said second angular margin to constrain said mask means against shifting sideways while moving crosswise of said table top.

6. The mask means as in claim 5 wherein said angle of said second margin is substantially 90° relative to the plane of said planar member.

7. For use with a diagnostic x-ray table including a table body, an x-ray source in said body and a table top for supporting an examination subject in the path of an x-ray beam from said source, a spot film device adapted to be located on a side of said table top remote from said source, said spot film device comprising:

support means for being disposed crosswise of said table top and extending generally from the rear toward the front of said table, main carriage means and means for guiding said carriage means to translate between a retracted position at the rear of said support means and an advanced radiographic position at the front of said support means, inner second carriage means and means on said main carriage means for guiding said second carriage means to translate in opposed directions relative to said main carriage means and generally perpendicular to the line of movement of said main carriage means, cassette holder means mounted to said second carriage means for translation therewith, means for translating said first carriage means, means for translating said second carriage means, individual generally planar mask means and means for guiding said mask means individually between retracted position and advanced radiographic position along parallel paths disposed between said cassette holder means and said x-ray source, each of said mask means having an aperture for separately and cooperatively defining the x-ray beam on a cassette in said holder means, reversible motor means for the respective mask means and operative to alternately advance said mask means to radiographic position in the path of the beam from said x-ray source and to retract said mask means, pulley means disposed in spaced relationship along the respective paths of movement of said mask means, one of said pulley means being driven by said respective motor means, belt means running on said pulley means and coupled with one of said mask means and including elastic means, stop means for stopping said mask means in advanced radiographic position, means responding to said mask means being advanced to a position near said stop means by causing a reduction in the electric power supplied to said motor means such that said mask means will butt said stop means, said elastic means will be stressed to absorb inertial force and said mask means will be held against said stop means under the influence of said motor means with reduced power applied thereto, first anti-scatter grid means oriented in one direction and secured on said main carriage means for being advanced to radiographic position therewith, second anti-scatter grid means and guide means for guiding the same alternately between retracted position and joint radiographic and fluoroscopic position, driving means including reversible motor means operatively coupled to said second grid means and operative to advance and retract said second grid means, means for disposing a fluoroscopic device in the path of said x-ray beam on a side of said carriage means which is opposite from said source, said second grid means being advanced and retracted for permitting fluoroscopy, respectively, with and without said grid means in said beam and being advanceable with said first grid means for permitting cross grid radiography.

8. The spot film device as in claim 7 wherein said belt means is a loop having opposite ends and said elastic means comprise springs means coupled between the ends of said belt means and a corresponding mask means.

9. The spot film device as in claim 7 wherein:

said driving means for said second grid means includes pulley means spaced from each other along the path of movement of said second grid means, said motor means being coupled in driving relation to one of said pulley means, belt means running over each of said pulley means and attached to said second grid means, said belt means including elastic means, stop means for arresting movement of said second grid means, means responsive to said second grid means reaching a position near stop means by causing a reduction in the electric power supplied to said motor means such that said second grid means will butt said stop means, said elastic means will be stressed to absorb inertial force and said second grid means will be held against said stop means under the influence of said servo motor means with reduced power applied thereto.

10. The spot film device as in claim 9 wherein said belt means is an open loop having opposite ends and said elastic means comprise spring means interposed between each of said opposite ends and said second grid means.

* * * * *